US006438691B1

(12) United States Patent
Mao (10) Patent No.: US 6,438,691 B1
(45) Date of Patent: Aug. 20, 2002

(54) TRANSMITTING MESSAGES OVER A NETWORK

(75) Inventor: Wenbo Mao, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/155,596

(22) PCT Filed: Mar. 27, 1997

(86) PCT No.: PCT/GB97/00897

§ 371 (c)(1),
(2), (4) Date: Oct. 1, 1998

(87) PCT Pub. No.: WO97/37461

PCT Pub. Date: Oct. 9, 1997

(30) Foreign Application Priority Data

Apr. 1, 1996 (EP) ............................................. 96302319

(51) Int. Cl.[7] .............................. H04L 9/00; H04L 9/30
(52) U.S. Cl. .......................... 713/176; 713/180; 380/30; 705/69
(58) Field of Search ................................. 713/176, 175, 713/170, 180; 380/30, 285, 277, 286; 705/64, 69

(56) References Cited

U.S. PATENT DOCUMENTS

| 4,759,063 A | | 7/1988 | Chaum | |
| 4,987,593 A | * | 1/1991 | Chaum | 705/69 |
| 4,995,082 A | * | 2/1991 | Schnorr | 713/169 |
| 5,491,752 A | * | 2/1996 | Kaufman et al. | 380/30 |
| 5,878,138 A | * | 3/1999 | Yacobi | 705/69 |
| 5,889,862 A | * | 3/1999 | Ohta | 705/69 |

FOREIGN PATENT DOCUMENTS

EP 384475 8/1990

OTHER PUBLICATIONS

Schneier, Bruce, Applied Cryptography: Protocols, Algorithms and Source Code in C, 2nd ed. Oct. 1995. section 21.3, pp. 510–511.*

* cited by examiner

*Primary Examiner*—Gail Hayes
*Assistant Examiner*—Ho S. Song (57) ABSTRACT

A method of transmitting a message over a network from a sender to a receiver, comprises the steps of: taking a message (Coin) to be signed by the sender; signing the message into a digital signature (e, y) of the sender (steps 56,58), the digital signature being generated as a function of that message using public and secret signature generators (x, r) of the sender, a private key (s) of the sender, and other publicly known values (a, p, q); and transmitting the signed message over the network to the receiver (step 60); characterised in that: the message to be signed by the sender incorporates a first value (f(x)) which is a first predetermined function (such as a secure one-way hash function) of the sender's public signature generator (x) (step 48). It is thus possible that the incorporation of a proper first value can be verified by a receiver of the message who requires the sender to sign the message using a public signature generator, and furthermore that if a sender signs and transmits the same message more than once, the private key of the sender can be derived from the plurality of signed messages and a relationship between the public and private signature generators.

18 Claims, 4 Drawing Sheets

TRANSMITTING MESSAGES OVER A NETWORK

TECHNICAL FIELD

This invention relates to a method of and apparatus for transmitting messages over a network, and in particular, but not exclusively, is concerned with "cash purchases" over a network such as the Internet.

BACKGROUND ART

Today, the business potential of the Internet, especially, of the world-wide-web applications, forms a new dimension in electronic commerce. It is believed that information purchases will form a very big part of the activities in the Internet electronic commerce. A typical nature of this form of commerce is to deal with a large volume of low-value payment transactions. The usual price for a few information pages can be as low as several cents. Various techniques proposed for macro payments are not suitable to be used here as transaction fees may well exceed the value of payments. Furthermore, these techniques do not preserve a proper purchaser's anonymity which can be an essentially important feature in information purchases. On the other hand, the vast diversity of the Internet information services (e.g. web-based services) means that the subscription-based services may not be very attractive to a large number of one-off viewers. It is thus reasonable to consider facilitating information purchases over the Internet with a cash-like payment instrument.

Chaum, U.S. Pat. No. 4,759,063, discloses a blind signature technique for cash-based electronic commerce. The subject of electronic cash has thereafter been widely studied and many techniques proposed to tackle various unsolved problems. Actual systems have also been implemented for trial use. However, when considering information purchases over the Internet, these previous techniques have various limitations.

Firstly, an evident limitation in various previous off-line digital cash techniques is the high system complexity. In some of these techniques, a coin will have too big a data size to be economically used (containing a large number challenge terms for detection of cheating); some also require using complex challenge-response interactions between the payer and payee for each coin spent (a non-cash feature); others critically rely on using tamper-resistant devices (expensive smartcards with a built-in observer to monitor transactions). Systems relying on smartcards also have a limitation in quick deployment over the Internet as most home/office computers today are not readily equipped with a smartcard reader. In some of the smartcard cash techniques, the built-in observer works itself without co-working with the cardholder's private key. Such techniques are potentially dangerous as compromising one smartcard devastates the whole system. Further, considering a fundamental principle of cryptography that a re-usable key with a limited length must have a limited lifetime, then systems using a system-wide observer also pertain to a high running cost due to the need of changing the observer in the system-wide devices from time to time.

Secondly, schemes using on-line banks, though they can prevent double spending (each coin is checked against replay during the time of payment) rather than merely detect it afterwards (yet still with a good anonymity service) are obviously not suitable for micro-payments. Here, the problem is not only in terms of economy, but also system performance. Banks are far too few compared with the vast number of small cash transactions; by processing on-line requests for such transactions, they are doomed to becoming serious system bottlenecks.

The present invention is concerned with enabling one or more of these problems to be solved, and it will be shown that an example of the invention can solve most, if not all, of these problems.

DISCLOSURE OF INVENTION

In accordance with a first aspect of the present invention, there is provided a method of transmitting a message over a network from a sender to a receiver, comprising the steps of: taking a message (Coin) to be signed by the sender; signing the message into a digital signature (e, y) of the sender, the digital signature being generated as a function of that message using public and secret signature generators (x, r) of the sender, a private key (s) of the sender, and other publicly know values (a, p, q); and transmitting the signed message over the network to the receiver; the message to be signed by the sender incorporating a first value (f(x)) which is a first predetermined function (such as a secure one-way hash function) of the sender's public signature generator (x) into the message to be signed by the sender.

It is thus possible that the incorporation of a proper first value can be verified by a receiver of the message who requires the sender to sign the message using a public signature generator, and furthermore that if a sender signs and transmits the same message more than once, the private key of the sender can be derived from the plurality of signed messages and a relationship between the public and private signature generators.

The signature preferably includes a second value (e) which is a second predetermined function (h( )) (such as a secure one-way hash function) dependent on the first value (f(x)).

The signature preferably includes a third value (y) which is a third predetermined function of the secret signature generator (r), the second value (e), the private key (s) of the sender, and at least one (q) of the publicly known values.

The message to be signed by the sender preferably incorporates a fourth value (g(v)) which is a fourth predetermined function (g( )) (such as a secure one-way hash function) of a public key (v) of the sender.

This latter feature may be provided independently of the first aspect of the invention. Therefore, in accordance with a second aspect of the present invention, there is provided a method of transmitting a message over a network from a sender to a receiver, comprising the steps of: taking a message (Coin) to be signed by the sender; signing the message into a digital signature (e, y) of the sender, the digital signature being generated as a function of that message using public and secret signature generators (x, r) of the sender, public or private keys (v, s) of the sender, and other publicly known values (a, p, q); and transmitting the signed message over the network to the receiver; the message to be signed by the sender incorporating a fourth value (g(v)) which is a fourth predetermined function (g( )) (such as a secure one-way hash function of the public key (v) of the sender into the message to be signed by the sender.

In accordance with a third aspect of the present invention, there is provided a method of verifying a signed message received over a network, the signed message purporting to have been transmitted in accordance with the method of the first aspect of the invention, comprising the steps of: calculating an apparent public signature generator (z) of the sender using the signed message, a public key (v) of the sender and other publicly known values (a, p); calculating a fifth value (f(z)) which is the first predetermined function (f( )) of the apparent public signature generator (z); and comparing the fifth value (f(z)) with the first value (f(x)) incorporated in the received signed message.

In the case where a second value as defined above is expected in the received signed message, preferably the verifying method includes the further steps of: calculating a sixth value (e) which is the second predetermined function (h( )) of the fifth value; and comparing the sixth value (e) with the second value (e) included in the received signature.

In the case where a fourth value as defined above is expected in the received signed message, preferably the verifying method includes the further steps of: calculating a seventh value (g(v)) which is the fourth predetermined function (g( )) of a public key (v) of the sender received over the network; and comparing the seventh value (g(v)) with the fourth value (g(v)) incorporated in the signed message.

This latter feature can be provided independently of the third aspect of the invention. Therefore, in accordance with a fourth aspect of the present invention, there is provided a method of verifying the public key of the sender of a signed message received over a network, the signed message purporting to have been transmitted in accordance with a method according to the second aspect of the invention, comprising the steps of: calculating a seventh value (g((v)) which is the fourth predetermined function (g( )) of the public key (v) of the sender received over the network; and comparing the seventh value (g(v)) with the fourth value g(v) incorporated in the signed message.

The invention also encompasses apparatus which is adapted to perform any of the methods described above.

DESCRIPTION OF DRAWINGS

A specific embodiment and examples of the invention will now be described, by way of example, with reference to the accompanying drawings, in which.

BEST MODE OF CARRYING OUT THE INVENTION, & INDUSTRIAL APPLICABILITY

In an example of the invention described below, an off-line micro-cash technique is set out which is suitable for purchasing information (and other) services over the Internet. A number of cash features will be supplied. These include: purchaser's anonymity, identifying a double spender with strong proof, using no on-line banks for payment, being independent of tamper-resistant devices, and providing a coin sub-divisible to arbitrary denominations (an important feature suitable for a single page information purchase). The main goal is to supply these services at a very low cost affordable by the system in accordance with the typically low values of per-payment transactions. This goal is achieved by the system simplicity in terms of small data size for representing coins (a payment of an arbitrary amount can be sent in less than one kilobyte), and in terms of no need of interactive communications between purchaser and merchant (a payment can be made in a single email).

Taking a pragmatic approach to spender's anonymity, the anonymity service in the example of the invention is based on a trust that public-key certification authorities (CA's) do not collude with system suppliers (banks). Such a collusion will give a bank a cheap way to link each coin with its spender. Collusion between a bank and merchants can also defeat the anonymity service. However, it will be seen that, unless the collusion is on a large scale and therefore very costly for a bank, it will have a very limited extent of damage to the spender's anonymity. Nevertheless, such a pragmatic, low-cost anonymity service is appropriate to the system. From the system suppliers' point of view, low-cost is essential considering the low values of typical transactions. Even from the consumers' point of view, it is believed that this weak sense of anonymity will be acceptable by many users as they will regard the convenience of securely sending money over the Internet to outweigh the extremely small probability of collusions between a bank and a CA, or between a bank and a vast number of merchants. People's attitude toward sending money over the Internet is expected to change. For instance, sending a few cents or a couple of dollars over the Internet will no longer be considered as "dangerous" as sending one's credit-card number (even encrypted).

Similar to all other off-line cash techniques, a double spender will be identified after a double spending has occurred. However, a unique feature in the after-the-fact identification is that the identification is in terms of discovering the double spender's private key by the bank. Such a result of identification is effective in the following scenario. The bank can simply show the double spender's private key to the appropriate public-key certification authority; the associated public-key certificate can then be revoked instantly and unconditionally. Thus, no matter how small an amount of money (even a single penny or cent) is double spent, there are no possibly expensive legal requirements for the bank to process regarding the revocation of the certificate in question. This identification method is therefore particularly suitable for micro-payment transactions. The method also strongly deters double spending: a new certificate for a new pair of public/private keys for an identified double spender can be made sufficiently expensive that the price far outweighs the benefit of double spending low-value coins.

The identification technique to be described uses a variation of Schnorr's signature scheme. Given a data in a certain format, exactly only one signature can be made on the data. Making more than one signature on the same data will lead to disclosure of the private key that is used for generating the signatures and for proving the identity of the signer.

Firstly, a description will be given of the scheme disclosed by Schnorr in U.S. Pat. No. 4,995,082, with reference to FIGS. 1 to 3. As a public-key crypto-algorithm, Schnorr's signature scheme has a pair of public/private keys. In Schnorr's scheme, users in the whole system can share some public values as part of their public keys. First, choose two primes, p and q. Here, p is a large prime (e.g. $p>2^{512}$) such that the discrete logarithm problem in $Z_p^*$ is intractable; q is also a large prime (e.g. $q>2_{140}$) and $q|(p-1)$. Then, choose a number $\alpha \epsilon Z_p^*$ with order q (q is the smallest prime number satisfying $\alpha^q=1$ (mod p); such an $\alpha$ can be computed as the (p−1)qth power of a primitive element modulo q). It will be assumed that all parties in the system share these numbers.

Figure 1:
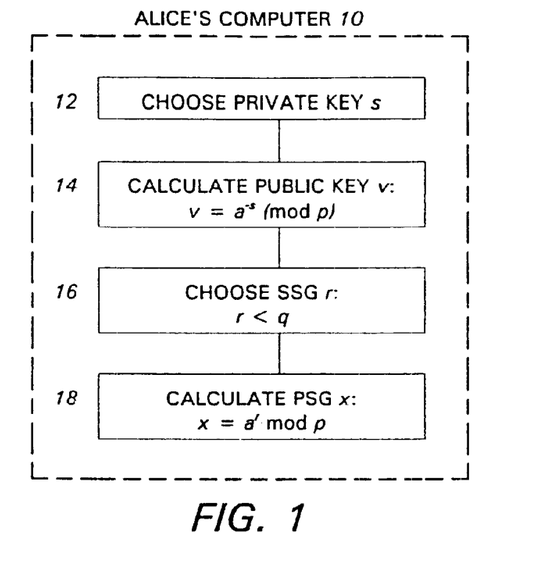
FIG. 1 is a schematic diagram of a sender's computer showing the setting-up of various parameters, common to the prior art and a preferred embodiment of the invention.

To generate a particular public-key/private-key key pair, a prospective purchaser, herein called "Alice", chooses a random number less than q in step 12. This is her private key, s. Then, in step 14 calculate:

$$v=a^{-s} (\mod p) \qquad (1)$$

where v is Alice's public key.

Schnorr's signature scheme uses a secure one-way hash function. Let h( ) denote a secure one-way hash function. It should be computationally infeasible to find two input values $x \neq x'$ such that $h(x)=h(x')$; also with respect to the input, the output from h( ) behaves like an oracle, in that one cannot generate an expected output value by algorithmically manipulating the input values.

Figure 2:
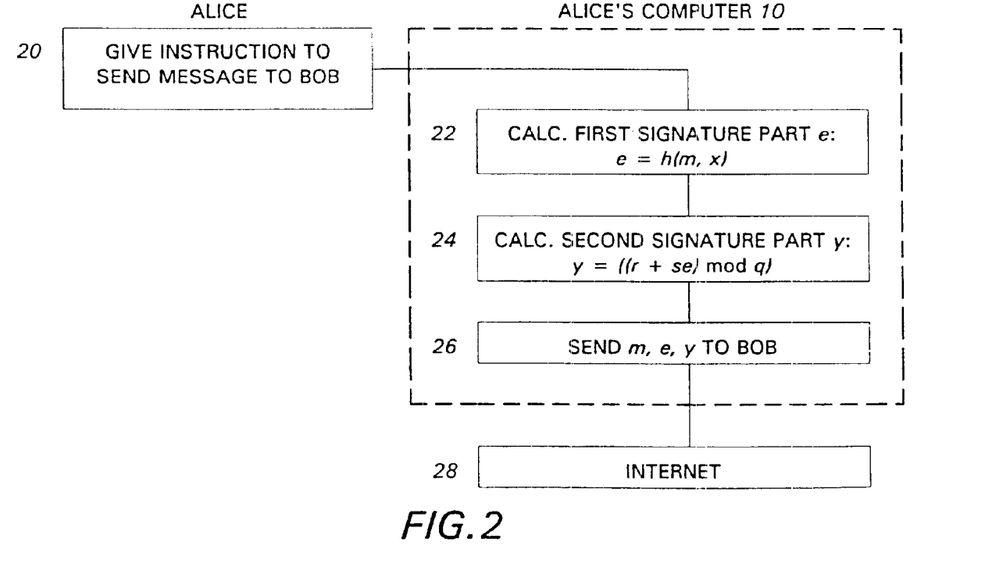
FIG. 2 is a schematic diagram of a sender's computer showing steps taken in the prior art to send a message.

To make a signature on message m, Alice picks a random number r, less than q (step 16), and does the following computations:

Step 18 $x=(a^r \mod p) \qquad (2)$

Step 22 $e=h(m, x) \qquad (3)$

Step 24 $y=((r+se) \mod q). \qquad (4)$

Figure 3:
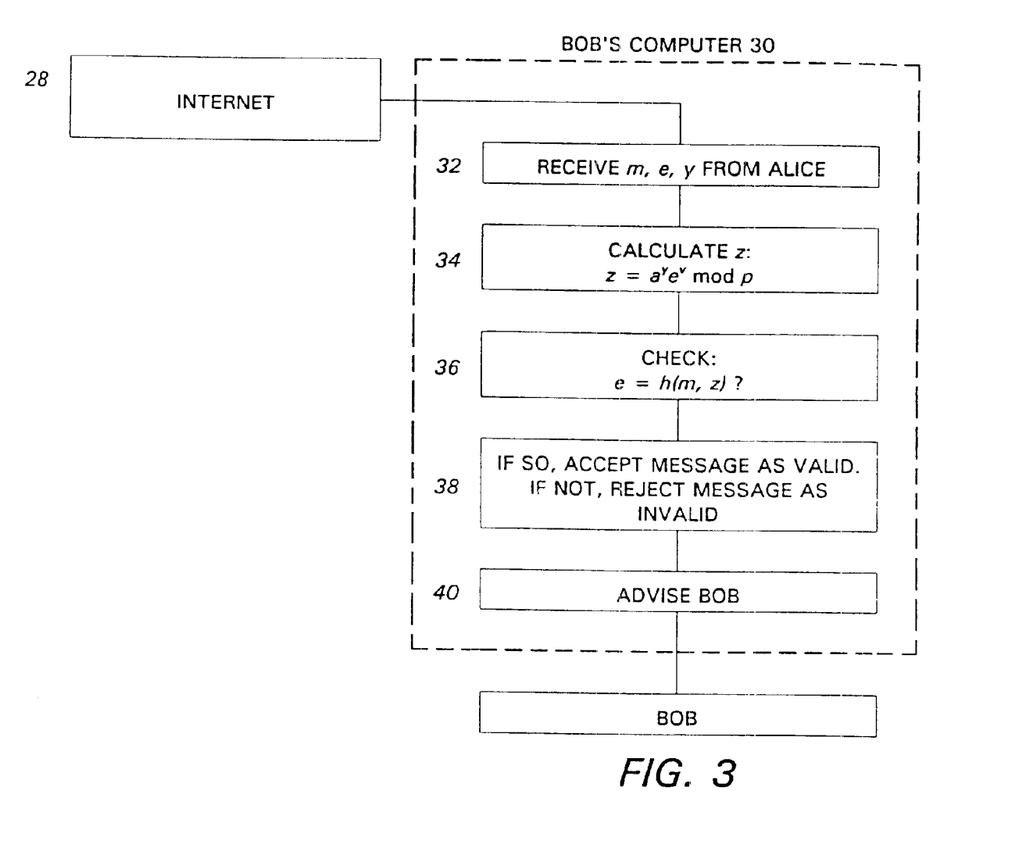
FIG. 3 is a schematic diagram of a receiver's computer showing steps taken in the prior art to verify a received message.

The signature on the message m is the pair e, y. We will call the other two numbers, r and x, "secret signature generators" and "public signature generators", (or SSG, PSG), respectively. In step 26, Alice sends the signature to a merchant, herein called "Bob." Bob verifies the signature by computing:

Step 34 $z=(a^y v^e \mod p) \qquad (5)$ and checking if

Step 36 $e=h(m, z)$.

If the equation holds, in step 38 he accepts the signature as valid.

Schnorr's signature scheme gets its security from the difficulty of calculating discrete logarithms. The difficulty means that the private key s cannot be easily derived from the public key v even with their relationship shown in Equation (1). Similarly, the secret signature generator (SSG) r cannot be easily derived from the non-secret number z from their relationship in Equation (2) (z is equal to the public signature generator (PSG) x).

Besides relying on the difficulty in computing discrete logarithms, the security of the one-way hash function h( ) also plays an important role in Schnorr's scheme. This security derives from the difficulty in preparing input data that maps to a given output value, or to find two input data that collide to the same output value. When Bob verifies the signature, he knows from the property of the hash function that, without knowing Alice's private key, it is computationally infeasible to create the consistency among the numbers e, y, z and m which are related under the hash function used. The hash function h( ) is essentially an oracle; it is difficult to prepare input data that map to a given output value.

Note that the SSG r must be treated as one-time material. It must not be used more than once to generate different signatures. Assume otherwise, an SSG r has been used before by Alice in a signature on some message m and now Alice re-uses it to generate a new signature on a different message m'. Let e and y be the numbers used by Bob during the verification of the signature on m, and e', y' be those that correspond to the new message m'. Now that m'≠m, from Equation (3) and the property of the hash function we know almost for sure (with an overwhelming probability) that e' e (mod q). If these non-secret numbers (e, y) and (e', y') are acquired by Bob, he can compute Alice's private key s by subtracting two instances of Equation (4) and obtain:

$$s=((y-y')/(e-e') \mod q) \qquad (6)$$

On the other hand, as long as Alice does not repeat using any old SSG when creating a new signature, then subtraction of Equation (4) will only result in y−y'≡r−r'+s(e−e') (mod q). Here the value r−r' 0 (mod q) remains to be a secret that protects the private key s just in the same way as in Schnorr's scheme. More precisely, Alice should not use an SSG which is related to an old SSG in any known algorithmic way. As long as this precautionary measure is taken, no arithmetic calculation is known so far that allows one to derive the signer's private key from different instances of signature values. In fact, the digital signature standard (DSS) proposed by NIST uses essentially the same principle to protect the signer's private key.

The example of the invention employs the property illustrated in Equation (6) to identify a user who has used certain data more than once, and the identification can be supported with a strong proof. The idea is to create a consistent relationship between a piece of data to be signed (a condition for using the data) and a PSG (x or z in Schnorr's scheme) used for making the signature. In other words, let Alice (signer) sign a piece of data, and let Bob (signature verifier) be provided with a method to know that, for the data in question, Alice has used a required PSG (and hence its correspondent SSG, see below). If a wrong PSG has been used, then Bob will not accept the signature even if it is valid under the usual usage of Schnorr's scheme.

Note that it is impossible for Alice to find two SSG's r r' (mod q) that map to PSG's satisfying x≡x' (mod p). Being able to do so would allow Alice to sign the same data twice without disclosing her private key. This is because from x≡x' (mod p), i.e. $a^r \equiv a^{r'}$ (mod p), we have $a^{r-r'} \equiv 1$ (mod p); but a has order q which means q is the smallest non-zero number satisfying $a^q \equiv 1$ (mod p), so it has to be the case that r≡r' (mod q).

This idea finds a good application in designing an electronic cash technique in accordance with the invention. A double spender of a coin will be identified with a strong proof whereas honest users enjoy their anonymity. Below there follows a description with reference to FIGS. 1 and 4 to 6 of an example of simple cash coin in accordance with the invention which has this property obtained from using a variation of Schnorr's scheme.

Figure 4:
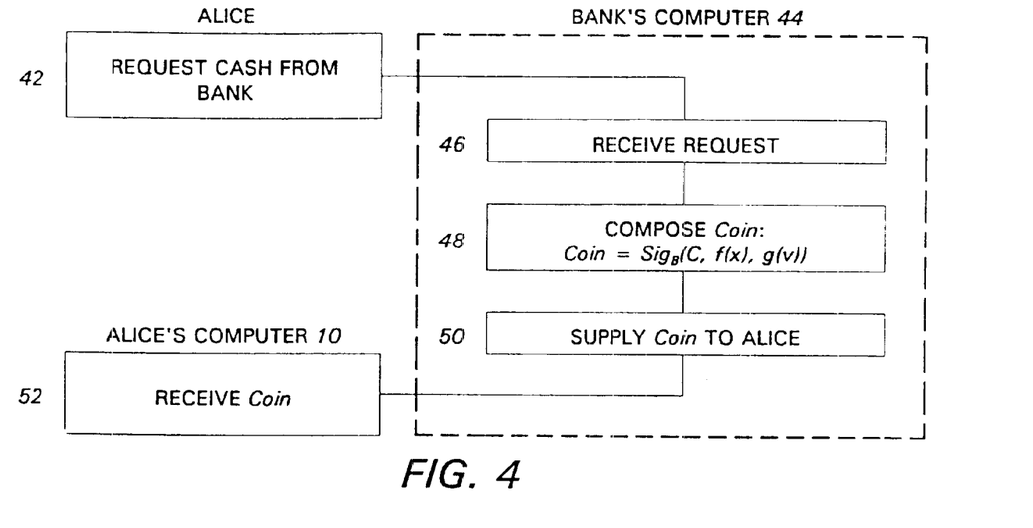
FIG. 4 is a schematic diagram of a Bank's computer showing steps taken in the preferred embodiment of the invention to supply a Coin.

Let Alice have a coin constructed as a result of her cash withdrawal from a bank (not necessarily from her own bank). The coin has been digitally signed by the bank to be worth a certain amount of value, and this can be validated by any receiver of the coin (with the use of a public-key certificate authority, CA). The bank's signature on the coin follows Chaum's blind signature technique. The coin is blinded in that, once Alice has completed the withdrawal, the bank then loses any link between the coin, and the withdrawer, Alice. For conciseness, in this specification, a description of the known anonymous cash withdrawal procedure based on using the blind signature technique has not been included, but reference is directed to patent document During the withdrawal time, the coin is constructed such that it integrates a pair of one-way hashed values, f(x), g(v). The first value is mapped from a PSG x chosen by Alice, and the second from the Alice's public key v. Note that the whole withdrawal process need not use Alice's public key v at all. This is because the bank need not check the correctness of these two hashed values. Later it will be seen that Alice will be wasting her money if she integrates incorrect values into a coin.

Let $Sig_B$ be the bank's blind signature. We can denote a coin as follows:

Step 48 Coin=$Sig_B(C, f(x), g(v))$.

Here C is called a "coin pseudonym", which is recognisable as a bank coin by any receiver who can verify the bank's blind signature. In Schnorr's scheme, a pair of SSG, PSG can be pre-computed. So there will be no problem for Alice to prepare PSG x (and the respective SSG r) during the withdrawal time.

Figure 5:
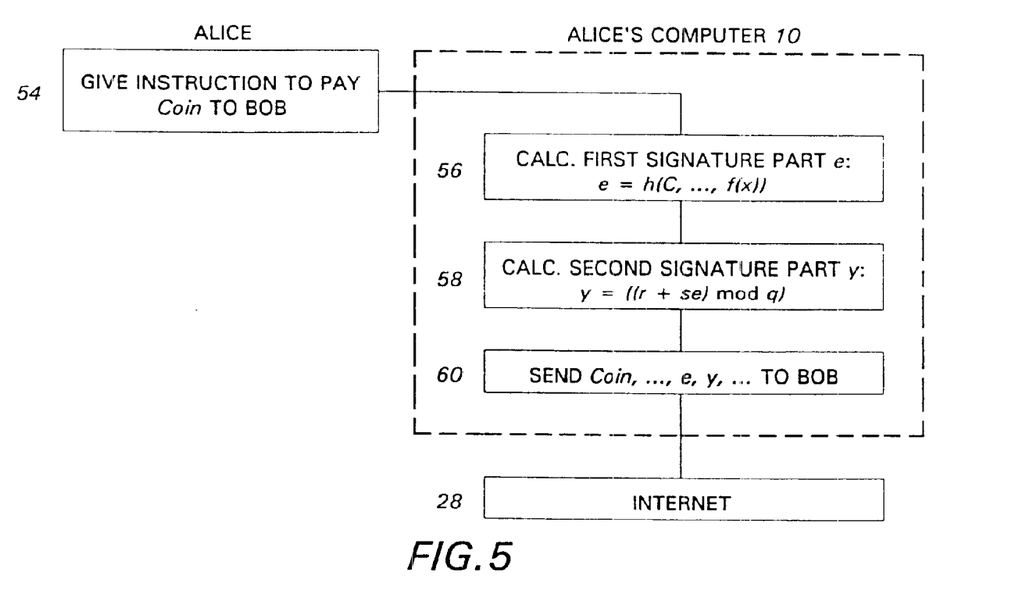
FIG. 5 is a schematic diagram of a sender's computer showing steps taken in the preferred embodiment of the invention to pay the Coin to a receiver.

When Alice pays Coin to a merchant, she is required to sign the pseudonym C using the PSG x integrated in Coin. Herein this signature is called a "spending signature". The spending signature on C should include the merchant's identity and a timestamp stating the spending time. Namely, the message to be signed (m in Equation (3)) becomes:

C, merchant_id, timestamp.

The spending signature uses a variation of Schnorr's original scheme: the value e will be computed by the following equation different from the original form in Equation (3), namely:

Step 56 $e=h(C, \text{merchant\_id}, \text{timestamp}, f(x))$ (7)

In this variation, a hashed valuef(x) is used, rather than directly using x as in the case of the original Schnorr's scheme (cf Equation (3)). It will be shown below that this variation will prevent the bank from discovering Alice's public key (when Alice does not double spend). In order to let the merchant verify the spending signature, Alice should also send her public key v together with a valid key certificate to the merchant. Let Cert(X, K) be a public-key certificate issued by a well-known CA certifying the public key K to the principal X, and let "X →Y: message" denote that the principal X sends the message to the principal Y. The payment message will be seen as follows:

Payment: Alice →Merchant: Coin, merchant_id, timestamp, e, y, Cert(Alice_id, v)

Figure 6:
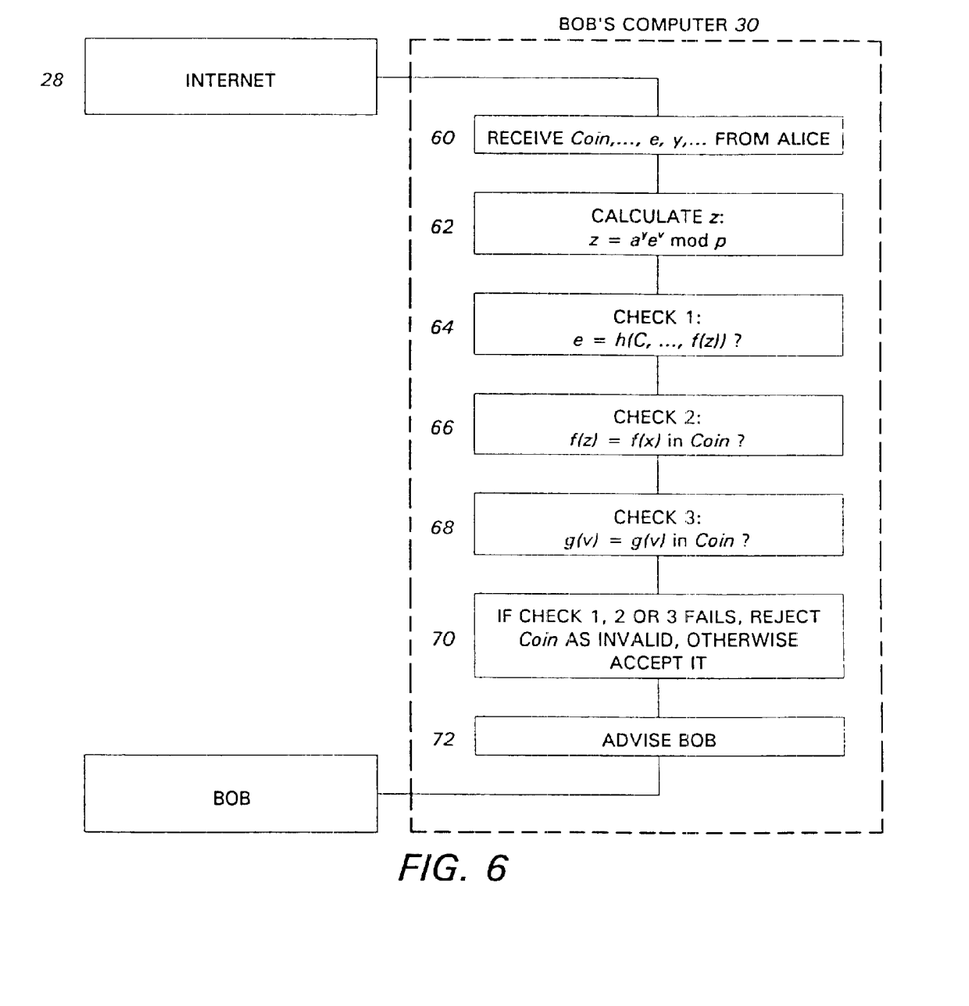
FIG. 6 is a schematic diagram of a receiver's computer showing steps taken in the preferred embodiment of the invention to verify a received Coin.

Here, the value y is computed by Alice as in Equation (4), see step 58. The merchant will verify the spending signature using Alice's public key v. He first uses the values e, y, a, v to compute z as in Equation (5), see step 62. Then, he verifies if Equation (7) holds by using f(z) in place of f(x), see step 64. He also checks the correct use of the PSG x and the public key v. The two correct uses mean that z and v can be hashed using f( ) and g( ) to the respective two hashed values in Coin, as shown in steps 66, 68. The payment will not be accepted if an incorrect PSG or public key is used, because the merchant will have trouble in redeeming an incorrectly signed coin.

Later, the merchant will redeem the coin by depositing the following "coin deposit" data to the bank:

Deposit: merchant →Bank: Coin, merchant_id, timestamp, E(z), e, y (8)

Here, E(z) denotes that the merchant encrypts the value z with the public key of CA. Note that using a CA's public key for encryption seems to add a new role for CA's. However, it will be seen later that this is a measure to detect a rare case of double spending (rare because it is that the double spender colludes with a merchant). Note that when a double spending occurs, a CA will be approached anyway in order to revoke the key certificates of those responsible. From this point of view, no essentially new role will be added to CA's.

The merchant must digitally sign the coin deposit. The signature not only means that the merchant has properly dealt with the payment, but also serves to prevent the bank from altering the data.

There now follows an analysis of the operation of the scheme described above. First, assume that Alice does not double spend her coins. Then her anonymity of spending the coins will be protected. This is because the coin-deposit in Equation (8) does not contain any information about spender's identity. Note that the anonymity here is in a sense that the merchant does not collude with the bank. It suffices for the merchant to be non-collusive if he just throws away the values v and z after the coin has been validated and accepted. v would directly identify Alice since it is her public key and its connection with her can be found from a suitable CA. More obscurely, the value z, if acquired by the bank, can also be used to derive v. This is because of the following congruence:

$v^e \equiv z/a^y \pmod{p}$ (9)

Once $v^e$ is known, it is easy to reveal v as:

$v=(v^{ed} \bmod p)$ where $ed \equiv 1 \pmod{p-1}$ (10)

The bank has e to compute d above. This is analogous to a broken RSA algorithm where the factors of the modulus are known. Without giving these values to the bank, it is infeasible for the bank to find who has spent the coin. Brute-force searching through the public-key space for matching values g(v) or f(x) (here, using f(x) is to check if a candidate result of Equation (5) can be hashed to f(x) in Coin) is computationally infeasible (the public-key space is vast) unless the bank can acquire a sufficiently large number of public keys of the users in the system (which should form a trivially small subset of the whole public-key space). This can be prevented by implementing the certification authorities that do not permit downloading public keys or certificates. Normal CA's should disallow such an abuse.

Now assume that the bank sees duplicated copies of the coin pseudonym C. This may be as a result of either (i) Alice's double spending, or (ii) the merchant's replay, or (iii) a collusion between Alice and the merchant.

In the first case (i), Alice double spends. It has been analysed that the differences in either merchant_id or timestamp will result in two pairs of (e, y) and (e', y') where e ≢ e'(mod q), and hence y≠y', with an overwhelming probability. These two pairs will be sufficient for the bank to discover Alice's private key s using Equation (6), and further obtain her public key v from Equation (1). The bank can verify the correctness of the revealed public key by checking if it can be hashed to g(v) in Coin. (An incorrectness indicates a collusion between Alice and the merchant and this will be dealt with in Case (iii).) Such an identification is effective in the following scenario. The bank can simply show the double spender's private key to the appropriate public-key certificate authority; the associated public-key certificate will be revoked instantly and unconditionally. Thus, no matter how small amount of money (even a single penny) is double spent, there are no possibly expensive legal requirements for the bank to comply regarding the revocation of the certificate in question. This identification method is therefore particularly suitable for micro-payment transactions. The method also strongly deters double spending: a new certificate for a new pair of public/private keys for an identified double spender can be made sufficiently expensive so that the price far outweighs the benefit of double spending the low-value coins.

Note that Alice cannot use different key pairs (certified or not) to sign different spending signatures on the same coin pseudonym (try to double spend without disclosing her identity). This is because the merchant will only accept a signature that can be verified using the public key that can be hashed to the value g(v) in Coin. Similarly, Alice cannot use a wrong PSG to create a spending signature because the merchant will only accept one that can be hashed to the value f(x) in Coin. Permitting a spender to use incorrect public keys or incorrect PSG's will lead to identifying the merchant as colluding with the double spender. Various cases of such collusion will be discussed in Case (iii).

In the second case (ii), the merchant double deposits. If Alice does not double spend, then the merchant cannot double deposit a coin received from Alice where the different copies of coin-deposit in data set (8) have different yet valid spending signatures of Alice. Clearly, this is due to the inability to forge Alice's spending signature. Thus, the possibility for the merchant to double deposit a coin is confined to the following way: he simply replays the coin-deposit in data set (8) with identical data. It is easy for the bank to discover the replay and thereby only one instance of deposit will be redeemed.

Note that the merchant is required to sign the coin-deposit digitally in the data set (8). Therefore, depositing incorrect or gibberish data as spending signatures in order to achieve double deposit will lead to identifying the merchant as malicious. In Case (iii), cases will be seen of identifying malicious merchants.

In the third case (iii), Alice and the merchant collude. A collusion will make sense only if it does not lead to identifying Alice and at the same time it lets the merchant deposit coins with consistent and non-identical spending signatures.

It seems that in order to achieve the above, the merchant has to permit Alice to use incorrect keys (uncertified or not matching g(v) in Coin), or incorrect PSG's, to sign the spending signatures. For instance, in the case of permitting using incorrect keys, a coin can be double spent by a person who has different (certified or not) key pairs, or by different people (e.g. members in the same family).

In these circumstances, upon seeing the duplicated coin pseudonym C, the bank's computation using Equation (6) will not correctly reveal Alice's private key. In an overwhelming probability, the revealed key will not belong to anybody (probability see below). For instance, let two spending signatures (e, y) and (e', y') have been created with the use of two different private keys $S_1$ and $S_2$, respectively. Then, using Equation (6) will result in the following value:

$$s' = ((s_1 e - s_2 e')/(e-e')) \pmod{q}$$

Similarly, if the merchant permits Alice to use incorrect PSG's which are mapped from two different SSG's $r_1$ and $r_2$, then Equation (6) will not disclose Alice's true private key either, but $$s' = (((r_1 - r_2 + s(e-e'))/(e-e')) \pmod{q}$$

Other wrong forms of "private keys" can also be expected from mixed uses of wrong keys and wrong PSG's. Let v' be the matching "public key" computed from Equation (1) using s'. Then, in an overwhelming probability, v' will be found to have not been certified to anyone. The probability that v' happens to be someone's public key is equal to that of having correctly guessed someone's private key.

If duplicated coin-deposits with different spending signatures have been deposited from the same merchant, then he is certainly malicious because either he has used incorrect public keys (cannot be hashed to g(v) or uncertified), or has permitted the use of incorrect PSG's during the time of verifying the spending signatures.

If duplicated coin-deposits with different spending signatures have been deposited from different merchants, then, at least one of the merchants is malicious and needs to be identified (e.g. Alice properly spends a coin with an honest merchant and then double spends the same coin with collusive one). In such a situation, the CA has to be approached for decrypting the values E(z) that have been deposited from the respective merchants. With the decrypted data, the bank has sufficient data to differentiate an honest merchant from malicious ones. An honest merchant is related to a quantity z which can be hashed to f(x), and can be used to compute a correctly certified public key v (using Congruence (9) and Equation (10)) that can be hashed to g(v). Any quantity z not satisfying either of these two tests identifies a malicious merchant. The merchant cannot be framed because he has digitally signed the coin-deposit.

Note that when the CA is used, the identity of the spender becomes known to the bank. However, the bank cannot abuse this method with a true intention to identify a non-double-spender (e.g. to claim falsely a double spending) because the CA will demand the bank demonstrate a merchant to be malicious whenever the CA is approached to decrypt E(z). The bank itself will be considered as malicious if at the end it cannot prove a merchant to be malicious.

It is interesting to point out that, as long as a coin is not double spent or double deposited, the use of incorrect public keys or PSG's or handing in gibberish spending signatures will not be discovered. Indeed, here, the bank need not be concerned of anything other than double spending.

To this end, we see that the merchant is unable to help Alice to double spend.

Note that in the rare case of double spending achieved by a collusion between Alice and the merchant, the use of CA for decrypting the message E(z) seems to add a new role (or new burden) to CA. Nevertheless, this seemingly new role is in fact covered by the current services of CA's. This is because, when a collusion occurs, the key certificates of the responsible must be revoked anyway and the revocation is clearly part of the services of the CA's under the existing definition. A CA will never be approached if it is not requested to revoke a certificate.

As in Schnorr's scheme, the security relies on the difficulty of searching for collisions in hash functions. If Alice can prepare collisions between different PSG's such that f(x)=f(x'), then she can double spend a coin using these two PSG's without being identified. Note that searching for collisions for different PSG's should start from searching for different SSG's (i.e., Alice must know different r r' that satisfy $f(a^r \bmod p) = f(a^{r'} \bmod p)$; the exponentiation makes the search much harder than is usual for preparing hash-function collisions.

There now follows a description of specific example protocols for Alice to pay cash coins in arbitrary denominations to various merchants, and for merchants to deposit coins to the bank.

Each of the principals, Alice A, various merchants $M_1$, $M_2$, . . . and the bank B is equipped with public/private key pairs and each of the public keys are properly certified to their owners by a well-known CA. So, each principal can recognise the public key of another principal. In particular, Alice's key pair is in the form of Schnorr's signature scheme described above.

During a withdrawal time Alice constructs a chain of coins $C_1, C_2, \ldots C_n$ from the bank B by running an anonymous cash withdrawal protocol. These coins are constructed such that once they are in the hands of Alice, the bank no longer has any link between Alice and them. Such an anonymous cash withdrawal can be achieved by using Chaum's blind signature technique mentioned above.

The structure of these coins follows that of the "Payword" technique expounded by Rivest and Shamir, or alternatively attributes to Lamport's original password identification technique (also known as the "S/Key" technique). A secure one-way hash function, h( ), is used to hash a secret number repeatedly for n times. Let $C_n$ be a secret number chosen by Alice. The chain of coins is constructed as follows:

$$C_i = h(C_{i+1}) \text{ for } i=0, 1, 2, \ldots, n-1 \quad (11)$$

She also chooses the first SSG $r_1$ and computes the respective PSG $x_1$, and lets B sign the pseudonym $C_0$:

$$\text{Sig}_B(C_0, g(v), f(x_1), n) \quad (12)$$

Here, $C_0$ is called a "pseudonym-top"; it is not a coin. On the other hand, $C_i$ $(1 \leq i \leq n)$ are n coins. The signature (12) shows that by signing the pseudonym-top $C_0$, the bank has essentially signed all of the n coins. These coins are said to be under the pseudonym-top $C_0$. The hashed values g(v) and $f(x_1)$ have also been signed by the bank. So, the correct use of these coins can be verified later by a merchant using the public key v and the first PSG $x_1$. Note that, the blinded withdrawal procedure need not be based on using the public key v.

Now Alice can start to spend coins. Starting with an initial payment of i coins to $(1 \leq i \leq n)$ a first merchant $M_k$ the idea is to disclose the coin $C_i$ to $M_1$. The coin $C_i$ will be called the "bottom-coin." The merchant can verify the validity of the coins between the pseudonym-top and the bottom-coin by recursively hashing the bottom-coin $C_i$ for i times (see formula (11)). The computation will finally result in the pseudonym-top $C_0$. To this end, the signature of the bank on the pseudonym-top can be verified (see (12)). However, the merchant will only accept these coins provided that Alice has also correctly signed the pseudonym-top using the one-time signature scheme that was described previously. Alice must generate the signature with the use of a PSG that can be hashed to $f(x_1)$. In addition, Alice must also generate a second SSG $r_2$ and send the hashed value of the second PSG $f(x_2)$ to the merchant. The usage of the second PSG will be clear in a moment. A nice feature in Schnorr's scheme is that all of the SSG, PSG pairs can be pre-computed by the signer before the signing time. Thus, there will be no problem for Alice to prepare these pairs for future use.

Upon acceptance of these i coins, the merchant $M_1$ should digitally sign the bottom-coin $C_i$ together with the hashed value $f(x_2)$, i.e. $M_1$ should send message $\text{Sig}_{M1}(C_i, f(x_2), (n-i))$ back to Alice. This signature will serve the same function as the bank's signature for the pseudonym-top in (12). Namely, Alice can use it to spend the rest of the coins $C_{i+1}, C_{i+2}, \ldots C_n$ by using $C_i$ as a new top. For this reason, the term "current-top" will be used to refer to $C_i$. By combining the bottom-coin with a PSG, the bottom-coin is turned into a current-top. Now this quantity can no longer be spent as a coin. Later, the merchant $M_1$ can use $C_0, C_i$ to redeem i coins from the bank B as will be described in more detail below.

Describing now a general setting, suppose Alice has spent j (j<n) coins to k-1 previous merchants $M_1, M_2, \ldots, M_{k-1}$ (some or all of them may be the same merchant) and she now holds the data $\text{Sig}_{Mk-1}(C_j, f(x_k), (n-j))$, i.e. the current-top and the hashed value of a PSG usable for the next payment. Here, $M_{k-1}$ is the merchant with whom Alice has shopped most recently. Under this general setting, we will specify the payment protocol with which Alice pays i coins to the next merchant $M_k$ for k>0. These i coins are under the current-top $C_j$. Note that in the above description of the initial payment, we have described a special case where j=0, k=1 and $M_0$=B.

Payment $A \rightarrow M_k$: $\text{Sig}_B(C_0, g(v), f(x_1), n)$, $\text{Sig}_{Mk-1}(C_j, f(x_k), (n-j))$, $\text{Cert}(M_{k-1}, P_{Mk-1})$, $C_{j+i}$, i, timestamp, $e_k$, $y_k$, $f(x_{k+1})$, $\text{Cert}(\text{Alice\_id}, v)$ Here $e_k = h(C_j, M_k, \text{timestamp}, f(x_k))$ and $y_k = (r_k + se_k \mod q)$. Upon receipt of this payment message, the merchant $M_k$ will first verify the spending signature on the current-top $C_j$. This is by computing $z_k$ from Equation (5) as follows:

$$z_k = (a^{y_k} v^{e_k} \mod p)$$

and checking if $$e_k = h(C_j, M_k, \text{timestamp}, f(z_k))$$

If the equation holds, the merchant will further check whether the spending signature has been correctly created. This is to check whether the public key v that he has used in verifying the spending signature can be hashed to g(v) and the quantity $z_k$ can be hashed to $f(x_k)$. Here g(v) has been signed by the bank in the pseudonym-top, and $f(x_k$ has been signed by the previous merchant $M_{k-1}$ in the current-top. The validation of such correctness will be in conjunction with the validation of the coins between the current-top and the bottom-coin. The merchant will perform the validation by repeatedly hashing the bottom-coin $C_{j+i}$ for i times to reach the current-top $C_j$, and further hashing it for another j times to reach the pseudonym-top $C_0$ followed by verifying the bank's digital signature. In this scheme, each time Alice spends coins under the current-top, she is required to sign the current-top. Thus, she cannot double spend even a single coin under each current-top.

If everything goes well, these i coins will be accepted. If there are still unspent coins left under the bottom-coin $C_{j+i}$, then there is a need to make change. In such a case, the merchant $M_k$ should send the following message back to Alice:

Change $M_k$ $_{pullout;zu638000.900A}$: $\text{Sig}_{Mk}(C_{j+i}, f(x_{k+1}), (n-j-i))$, $\text{Cert}(M_k, P_{Mk})$ With the signed data in the message "Change", the bottom-coin $C_{j+i}$ becomes the new current-top and Alice can further spend the rest of the coins under it.

By recursively hashing the quantity $C_n$ in the construction of coins, we use hash function h( ) to serve the role of a counter. These hashed quantities are not worth any value if they are not properly signed with correct spending signatures. Therefore, some usually required hash function properties, such as non-invertibility, collision-resistance, etc, are not essentially required here for h( ). In particular, the issue of information entropy loss due to repeatedly hashing a piece of data for n (n can be a large number) times need not be a concern here. Being able to invert h( ) does not lead to an ability to spend the revealed values as coins if one cannot correctly generate a spending signature.

Note that although the scheme lets a merchant generate a new current-top (by combining a new usable PSG and the bottom-coin with a digital signature), this does not mean that a subsequent merchant has to trust any previous merchant in that he has integrated a good usable PSG with the current-top. The usability of the PSG can be verified by the next merchant who is to validate some coins under the current-top. Alice has freedom to choose any PSG she likes. It is purely Alice's interest to let each merchant combine a good PSG into the current-top. Using an old PSG will risk disclosing her private key, whereas using a bad PSG (e.g. with an unknown SSG), Alice will be unable to sign the spending signatures correctly for the rest of the coins; namely, the coins under the current-top will be wasted.

It will further be seen that no merchant is able to help Alice by creating for her different copies of current-tops which are combined with different usable PSG's. The merchant $M_k$ can redeem the value of the i coins from the bank B by depositing the following data:

Deposit $M_k z$, 900 B: $\text{Sig}_B(C_0, g(v), f(x_1), n)$, $\text{Sig}_{Mk-1}(C_j, f(x_k(n-j)))$, $\text{Cert}(M_{k-1}, P_{Mk-1})$, $\text{Sig}_{Mk}(C_{j+i}, f(x_{k+1}), (n-j-i))$, $\text{Cert}(M_k, P_{Mk})$, timestamp, $e_k$, $y_k$, $E(x_k)$ These data are analogous to the coin-deposit in (8) above. The signature of the previous merchant on the current-top $C_j$ is needed in order to allow the current merchant $M_k$ to correctly redeem i coins. The merchant $M_k$ cannot redeem coins above the current-root (e.g. if he has intercepted the message "Deposit" sent from the previous merchant $M_{k-1}$) without being detected. The bank will eventually find that $M_{k-1}$ and $M_k$ claim the same coins where the spending signature for the "current-top" above these coins does not support $M_k$ (a wrong merchant id in the spending signature).

Upon receipt of the message "Deposit", the bank will check duplication of the coins between the current-top $C_j$ and the bottom-coin $C_{j+i}$. If any coin $C_l$ for $j<l<(j+i)$ is found in the database, a fraud has been detected. The bank can differentiate double spending from double depositing, and deal with these frauds accordingly (see below). If everything is correct, it will credit the merchant and archive some of the data in the coin-deposit. Note that for hashed values as coins, only those that have been signed by the spender and merchants (i.e. each current-top) need to be archived against fraud.

The merchant's entitlement to make a signature that combines a bottom-coin with a hashed PSG (hence turning that bottom-coin into a new current-top) does not mean that he is able to help Alice to make many "current-tops" that are combined with different usable PSG's. Assume that the merchant $M_k$ helps Alice by making the following two different "current-tops" to be viewed by subsequent merchants: $\text{Sig}_{Mk}(C_{j+i}, f(x), (n-j-i))$; and $\text{Sig}_{Mk}(C_{j+i}, f(x'), (n-j-l))$; where x x' and l may or may not be equal to i. Notice that for this help to make sense, Alice must not be asked to make more than one spending signature on any current-top of these two coins; in other words, although these two signatures form two bottom-coins viewed by the merchant $M_k$, he must not deposit both of them because their common current-top will identify him to be double depositing. The intention of this help is to let Alice use these different "current-tops" later without disclosing her private key (because of different PSG's used, even if l=i). However, the two subsequent merchants (possibly including $M_k$ himself) who receive coins under these two "current-tops" will hand them in as the second signature chunk in their respective messages "Deposit." This is equivalent to performing double deposit by the merchant $M_k$. Namely, if the merchant helps Alice to double spend in this way, the deposit data from other merchants will reveal his identity.

Having described an example of the invention, the advantages of the invention, or at least of the example thereof, can be summarised as follows:

(a) Spender's anonymity: as long as the spender does not double spend, the bank does not know who has spent the money. However, this is not a strong sense of untraceability because a collusive merchant can provide the bank with the spender's identity. It is believed that this weak sense of anonymity will be acceptable by many users as they will regard the convenience of sending money over the Internet to outweigh the extremely small probability of collusions between a bank and a large number of merchants. People's attitude toward sending money over the Internet is likely to change. For instance, sending a few cents or a couple of dollars over the Internet will no longer be considered as "dangerous" as sending one's credit-card number.

(b) Identifying double spender with strong proof. The identification is effective; the deterrence on double spending is strong; it is simple for the bank to require revocation of the double spender's public-key certificate.

(c) Using no on-line banks for making payment.

(d) Being independent of using tamper-resistant devices. Thus, the technique can readily be deployed over today's Internet.

(e) Coin sub-divisible to arbitrary denominations. For instance, a new chain of coins can worth 10 dollars with each coin worth 1 cent (i.e. n in the pseudonym-top is equal to 1,000). After Alice has sent the current-top to the merchant, she can continuously release the coins under it, until (s)he feels enough services/goods have been purchased. No further signature is needed for these coins. This is particularly suitable for web-based interactive information page purchase.

(f) Small data size for coins. Paying a merchant with arbitrary number of coins (up to n), the message "Payment" can readily be organised within one kilobyte (including key certificates). It is believed that this size of data may well be smaller than the previous techniques for off-line cash coins independent of using smartcards. The storage of arbitrary number of coins uses the same data size as that in the "Payment" message.

(g) No need of interactive communications between purchaser and merchant. In fact, the message "Change" is needed only to give change. Thus, a payment can be made in a single email.

Having described an example of the invention, it will be appreciated that many modifications may be made to it, and that it may have many other applications. For example, as explained above, if a spender double-spends, the bank can discover the sender's private key s and public key v. It is therefore then possible for a fraudulent bank employee to spend the remainder of the spender's money, rather than having the sender's public-key certificate revoked. In order to deal with this, the example scheme may be modified as follows:

a) A spender has a first certified public key v as before, a second certified public key v', and two corresponding private keys s and s', respectively.

b) Referring to FIG. 1, a second SSG r' is chosen such that r'<q, and a second PSG x' is calculated such that:

$x' = a^{r'} \mod p.$ c) Referring to FIG. 5, a third signature part e' is calculated such that:

$e' = h(C, \text{merchant\_id}, \text{timestamp}, x')$ i.e. based on x' as in Schnorr's scheme, rather that f(x') as in the main example described above.

(d) A fourth signature part y' is calculated such that:

$y' = ((r' + s'e')) \mod q$ (e) The transmission which is required to be sent to Bob is in the form:

Coin, merchant_id, timestamp, e, y, e', y', Cert(Alice_id, v, v')

i.e. also including the third and fourth signature parts e', y', and including the second public key v' in the public key certificate. It should be noted that, although the first public key v is integrated in Coin, the second public key v' is not.

(f) Referring to FIG. 6, Bob additionally calculates a second apparent PSG z' such that:

$z' = a^{r'y'} v'^{e'} \mod p$ (g) Bob then carries out a fourth check as follows:

$e' = h(C, \text{merchant\_id}, \text{timestamp}, z')?$ and if that check fails, then Coin is rejected as invalid in Step 70.

In the case of a double spend, the bank employee may be able to ascertain the spender's first private key s as discussed in the main example, but will not be able to ascertain the second private key s' and therefore not be able to misappropriate the remainder of the money.

What is claimed is:

1. A method of identifying a private key of a user re-using a digital coin, comprising the steps of:
    taking a message to be signed by the user;
    signing the message into a digital signature of the user, the digital signature being generated as a function of that message using public and secret signature generators of the user, and a private key of the user; and
    transmitting the signed message over a network to a receiver;
    wherein:
        the message to be signed by the user incorporates a first value which is a first predetermined function of the user's public signature generator, and upon re-use of the message subtracting the secret signature generator from the digital signature to enable the private key to be determined.

2. A method as claimed in claim 1, wherein the first predetermined function is a secure one-way hash function.

3. A method as claimed in claim 1, wherein the signature includes a second value which is a second predetermined function dependent on the first value.

4. A method as claimed in claim 3, wherein the second predetermined function is a secure one-way hash function.

5. A method as claimed in claim 3, wherein the signature includes a third value which is a third predetermined function of the secret signature generator, the second value, and the private key of the user.

6. A method as claimed in claim 1, wherein the message to be signed by the user incorporates another value which is another predetermined function of a public key of the user.

7. A method of verifying a signed message received over a network, the signed message purporting to have been transmitted in accordance with the method of claim 6, comprising the steps of:
    calculating an apparent public signature of the user using the signed message, and a public key of the user; calculating a further value which is the predetermined function of the apparent public signature generator; and
    comparing the further value with the value incorporated in the received signed message.

8. A method as claimed in claim 7, wherein the digital signature includes a second value which is a second predetermined function dependent on the first value, including the further steps of:
    calculating a sixth value which is the second predetermined function of the fifth value; and
    comparing the sixth value with the second value included in the received signature.

9. A method as claimed in claim 7, wherein the message to be signed by the sender incorporates a fourth value which is a fourth predetermined function of a public key of the sender including the further steps of:
    calculating a seventh value which is the fourth predetermined function of a public key of the sender received over the network; and
    comparing the seventh value with the fourth value incorporated in the signed message.

10. A method as claimed in claim 6, wherein the fourth predetermined function is a secure one-way hash function.

11. A method of verifying the public key of a user of a signed message received over a network, the signed message purporting to have been transmitted in accordance with the method of claim 6, comprising the steps of:
    calculating a seventh value which is the fourth predetermined function of the public key of the user received over the network; and
    comparing the seventh value with the fourth value incorporated in the signed message.

12. A method according to claim 1, wherein the message represents a sum of money.

13. A method of identifying a private key of a user re-using a digital coin, comprising the steps of:
    taking a message to be signed by the user;
    signing the message into a digital signature of the user, the digital signature being generated as a function of that message using public and secret signature generators of the user, and public and private keys of the user; and
    transmitting the signed message over a network to a receiver;
    wherein:
        the message to be signed by the user incorporates another value which is another predetermined function of the public key of the user, and upon re-use of the message subtracting the secret signature generator from the digital signature to enable the private key to be determined.

14. A method as claimed in claim 13, wherein the fourth predetermined function is a secure one-way hash function.

15. A method of verifying the public key of a user of a signed message received over a network, the signed message purporting to have been transmitted in accordance with the method of claim 14, comprising the steps of:
    calculating a further value which is the another predetermined function of the public key of the user received over the network; and comparing the further value with the another value incorporated in the signed message.

16. A method according to claim 13, wherein the message represents a sum of money.

17. Apparatus for identifying a private key of a user re-using a digital coin, comprising:

a store for taking a message to be signed by the user;

a signature generator for signing the message into a digital signature of the user, the digital signature being generated as a function of that message using public and secret signature generators of the user and a private key of the user, and wherein the signature generator is arranged so that (1) a value which is a predetermined function of the user's public signature generator is incorporated into the message to be signed by the user and (2) upon re-use of the message the secret signature is subtractable from the digital signature for enabling the private key to be determined; and a transmitter for transmitting the signed message over the network to a receiver.

18. Apparatus for identifying a private key of a user re-using a digital coin comprising:

a store for taking a message to be signed by the user;

a signature generator for signing the message into a digital signature of the user, the digital signature being generated as a function of that message using public and secret signature generators of the user, public and private keys of the user, and wherein the signature generator is arranged so (1) a value which is a predetermined function of the public key of the user and (2) upon re-use of the message the secret signature is subtractable from the digital signature for enabling the private key to be determined and is incorporated into the message to be signed by the user; and a transmitter for transmitting the signed message over the network to a receiver.

* * * * *